(12) United States Patent
Messick et al.

(10) Patent No.: US 11,126,236 B2
(45) Date of Patent: Sep. 21, 2021

(54) SYSTEM AND METHOD FOR THE REDIRECTION OF TRAPPED POWER IN A SHARED INFRASTRUCTURE ENVIRONMENT

(71) Applicant: DELL PRODUCTS, LP, Round Rock, TX (US)

(72) Inventors: Douglas E. Messick, Austin, TX (US); Aaron Michael Rhinehart, Georgetown, TX (US); Jeffrey S. Thelen, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 118 days.

(21) Appl. No.: 16/540,391

(22) Filed: Aug. 14, 2019

(65) Prior Publication Data

US 2021/0048875 A1 Feb. 18, 2021

(51) Int. Cl.
| | |
|---|---|
| *G06F 1/26* | (2006.01) |
| *G06F 1/3287* | (2019.01) |
| *G06F 1/3296* | (2019.01) |
| *G06F 1/16* | (2006.01) |
| *H04M 1/253* | (2006.01) |

(52) U.S. Cl.
CPC .............. *G06F 1/26* (2013.01); *G06F 1/1632* (2013.01); *G06F 1/263* (2013.01); *G06F 1/266* (2013.01); *G06F 1/3287* (2013.01); *G06F 1/3296* (2013.01); *H04M 1/2535* (2013.01)

(58) Field of Classification Search
CPC . G06F 1/26; G06F 1/263; G06F 1/266; G06F 1/28; G06F 1/30; G06F 1/3287; G06F 1/3296; H04M 1/2535
See application file for complete search history.

(56) References Cited

U.S. PATENT DOCUMENTS

| | | | |
|---|---|---|---|
| 10,599,201 B1 * | 3/2020 | Bonen | H04L 12/2885 |
| 2001/0035696 A1 * | 11/2001 | Knowles | H01L 41/042 |
| | | | 310/316.01 |
| 2003/0085621 A1 | 5/2003 | Potega | |
| 2003/0186592 A1 | 10/2003 | Potega | |
| 2015/0309951 A1 * | 10/2015 | Breakstone | G05B 11/01 |
| | | | 710/313 |
| 2016/0241029 A1 * | 8/2016 | Hodrinsky | H02J 7/0072 |
| 2016/0336745 A1 * | 11/2016 | Pandya | G06F 1/305 |
| 2017/0192474 A1 | 7/2017 | Robinson et al. | |
| 2018/0150343 A1 * | 5/2018 | Bernat | H03M 7/6011 |
| 2018/0192538 A1 * | 7/2018 | Sakalkar | G06F 1/26 |
| 2018/0375269 A1 | 12/2018 | Shultz et al. | |
| 2019/0094926 A1 | 3/2019 | Subramanian et al. | |

(Continued)

*Primary Examiner* — Thomas J. Cleary
(74) *Attorney, Agent, or Firm* — Larson Newman, LLP (57) ABSTRACT

A physical power supply unit (PSU) may be connected to several load subsystems. A first load subsystem may receive a first portion of a first load power directly from the physical PSU via a main power connector, the main power connector having a power limit less than the first load power. A second load subsystem may receive a second load power directly from the physical PSU to provide a second portion of the first load power to the first load subsystem via a power connection between the second load subsystem and the first load subsystem. A sum of the first portion of the first load power and the second portion of the first load power may be greater than the power limit of the main power connector.

20 Claims, 5 Drawing Sheets

(56) References Cited

U.S. PATENT DOCUMENTS

| | | | |
|---|---|---|---|
| 2020/0004282 A1* | 1/2020 | Choi | H01L 28/10 |
| 2020/0004620 A1* | 1/2020 | Suenaga | G06F 11/0772 |
| 2020/0089298 A1* | 3/2020 | Lin | G06F 11/3058 |
| 2020/0310515 A1* | 10/2020 | Jana | G06F 1/3209 |

* cited by examiner

SYSTEM AND METHOD FOR THE REDIRECTION OF TRAPPED POWER IN A SHARED INFRASTRUCTURE ENVIRONMENT

FIELD OF THE DISCLOSURE

The present disclosure generally relates to information handling systems, and more particularly relates to the redirection of trapped power in a shared infrastructure environment.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A physical power supply unit (PSU) may be connected to several load subsystems. A first load subsystem may receive a first portion of a first load power directly from the physical PSU via a main power connector, the main power connector having a power limit less than the first load power. A second load subsystem may receive a second load power directly from the physical PSU to provide a second portion of the first load power to the first load subsystem via a power connection between the second load subsystem and the first load subsystem. A sum of the first portion of the first load power and the second portion of the first load power may be greater than the power limit of the main power connector.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
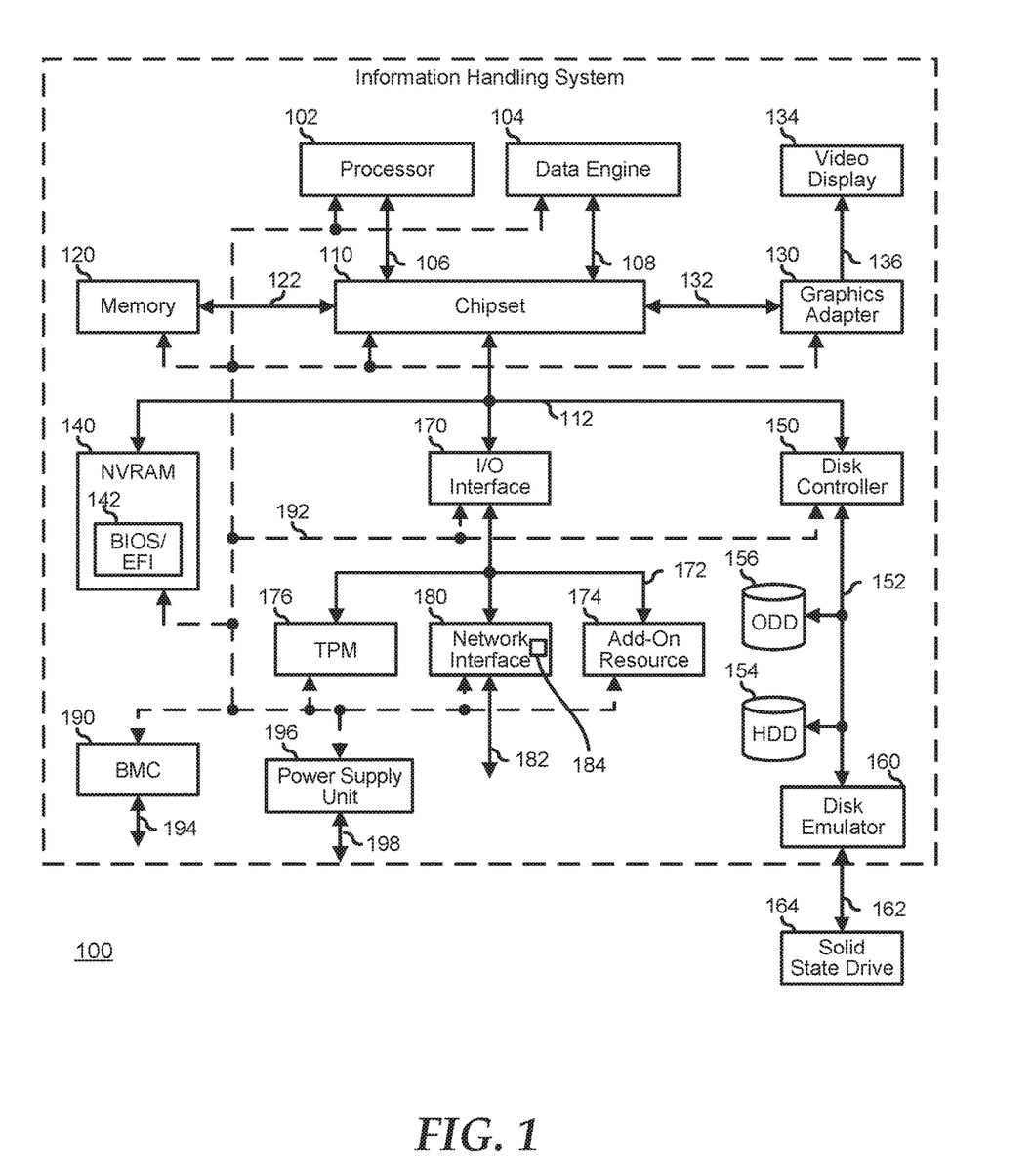
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processor 102, a data engine 104, a chipset 110, a memory 120, a graphics adapter 130, include nonvolatile random access memory (NVRAM) module 140, a disk controller 150, a disk emulator 160, an input/output (I/O) interface 170, a network interface 180, a trusted platform module (TPM) 176, a baseboard management controller (BMC) 190, and a power supply unit (PSU) 196. Processor 102 is connected to chipset 110 via processor interface 106, and data engine 104 is connected to chipset 110 via processor interface 108. Memory 120 is connected to chipset 110 via a memory bus 122. Graphics adapter 130 is connected to chipset 110 via a graphics interface 132, and provides a video display output 136 to a video display 134. In a particular embodiment, information handling system 100 includes separate memories that are dedicated to each of processor 102 and data engine 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

NVRAM module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I2C) interface, a Serial Peripheral Interface (SPI), a Universal Serial Bus (USB), another interface, or a combination thereof. NVRAM module 140 comprises a basic input and output system/extensible firmware interface (BIOS/EFI) module 142. BIOS/EFI module 142 includes BIOS/EFI code operable to detect resources within information handling system 100, to provide drivers for the resources, initialize the resources, and access the resources. BIOS/EFI module 142 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channel 182 that provide interfaces to devices that are external to information handling system 100. In a particular embodiment, network channels 182 is of a different type than peripheral channel 172, and network interface 180 translates information from a format suitable to the peripheral channel to a format suitable to external devices. An example of network channel 182 includes InfiniBand channels, Fibre Channel channels, Gigabit Ethernet channels, proprietary channel architectures, or a combination thereof. Network channel 182 can be connected to external network resources (not illustrated). The network resource can include another information handling system, a data storage system, another network, a grid management system, another suitable resource, or a combination thereof.

In accordance with at least one embodiment, network interface device 180 includes a virtual power supply unit (VPSU) 184 configured to redirect otherwise-trapped power from a physical power supply unit (PSU) 196 to a load such as processor 102 or data engine 104.

I/O interface 170 is connected to TPM 176 via peripheral channel 172. BMC 190 is connected by a management interface 192 to a plurality of system components, such as processor 102, data engine 104, memory 120, chipset 110, graphics adapter 130, I/O interface 170, disk controller 150, NVRAM module 140, TPM 176, network interface 180, add-on resource 174, and PSU 196. BMC 190 is connected to an external management interface 194 for platform management by an external IHS. PSU 196 is connected to a power source via power source connection 198.

Figure 2:
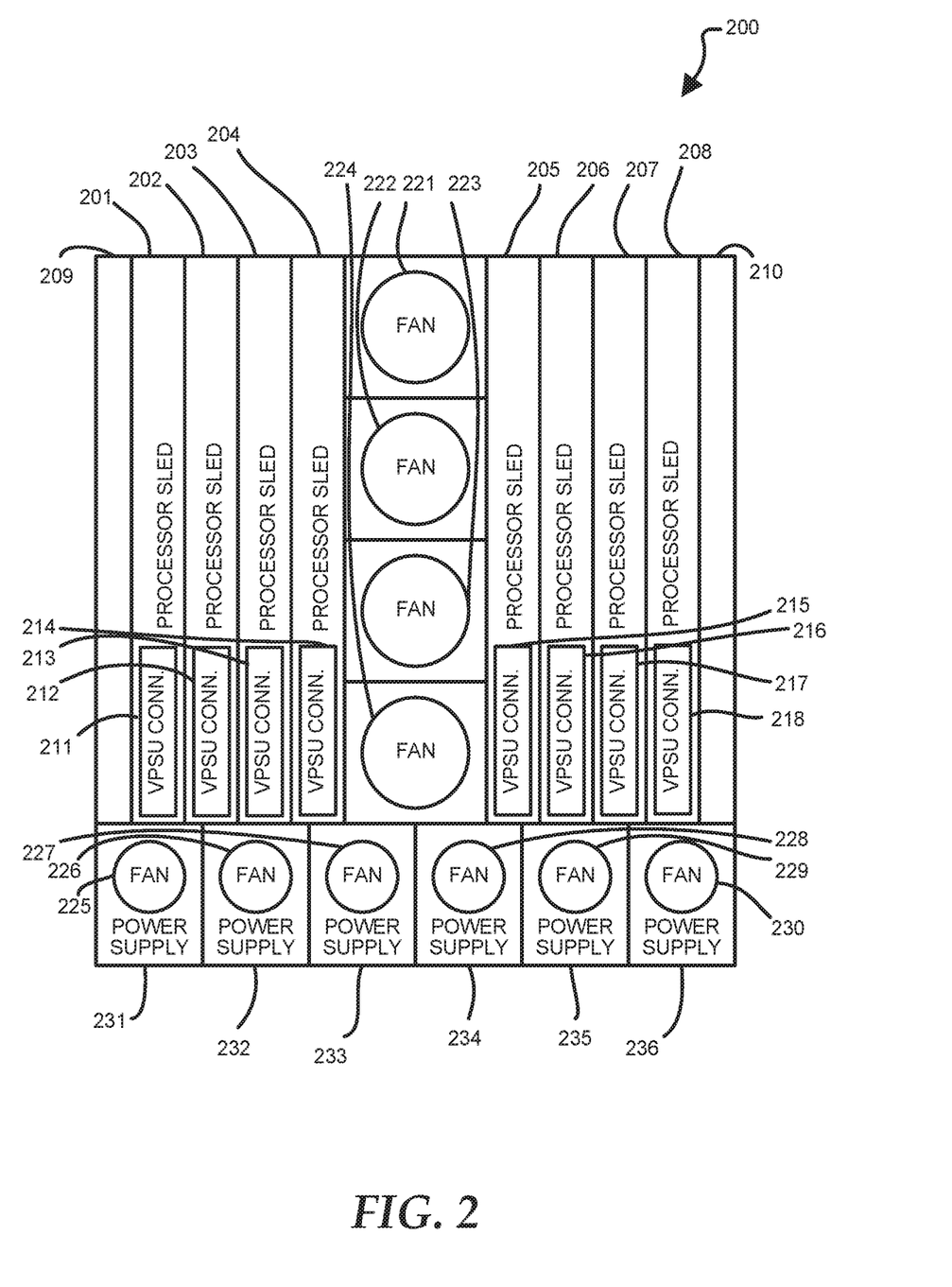
FIG. 2 is a front view illustrating an information handling system according to an embodiment of the present disclosure.

FIG. 2 shows an information handling system 200 that includes processor circuit board modules, or sleds, 201, 202, 203, 204, 205, 206, 207, and 208, common control panel 209, common control panel 210, power supply units (PSUs) 231, 232, 233, 234, 235, and 236, and fans 221, 222, 223, and 224. Processor sled 201 includes a virtual PSU (VPSU) connector 211. Processor sled 202 includes a VPSU connector 212. Processor sled 203 includes a VPSU connector 213. Processor sled 204 includes a VPSU connector 214. Processor sled 205 includes a VPSU connector 215. Processor sled 206 includes a VPSU connector 216. Processor sled 207 includes a VPSU connector 217. Processor sled 208 includes a VPSU connector 218.

VPSU connectors 211-218 can be adapted to receive trapped power from a system component, such as an input-output module (IOM), that receives power for its own use from one or more of PSUs 231-236. The trapped power, once freed via one or more VPSUs on the system component, such as an IOM, and one or more VPSU connector on one or more processor sleds or other system components which are the destinations for the trapped power, can be used to supplement power the one or more processor sleds or other system components can receive directly from one or more of PSUs 231-236. PSU 231 includes fan 225. PSU 232 includes fan 226. PSU 233 includes fan 227. PSU 234 includes fan 228. PSU 235 includes fan 229. PSU 236 includes fan 230.

Figure 3:
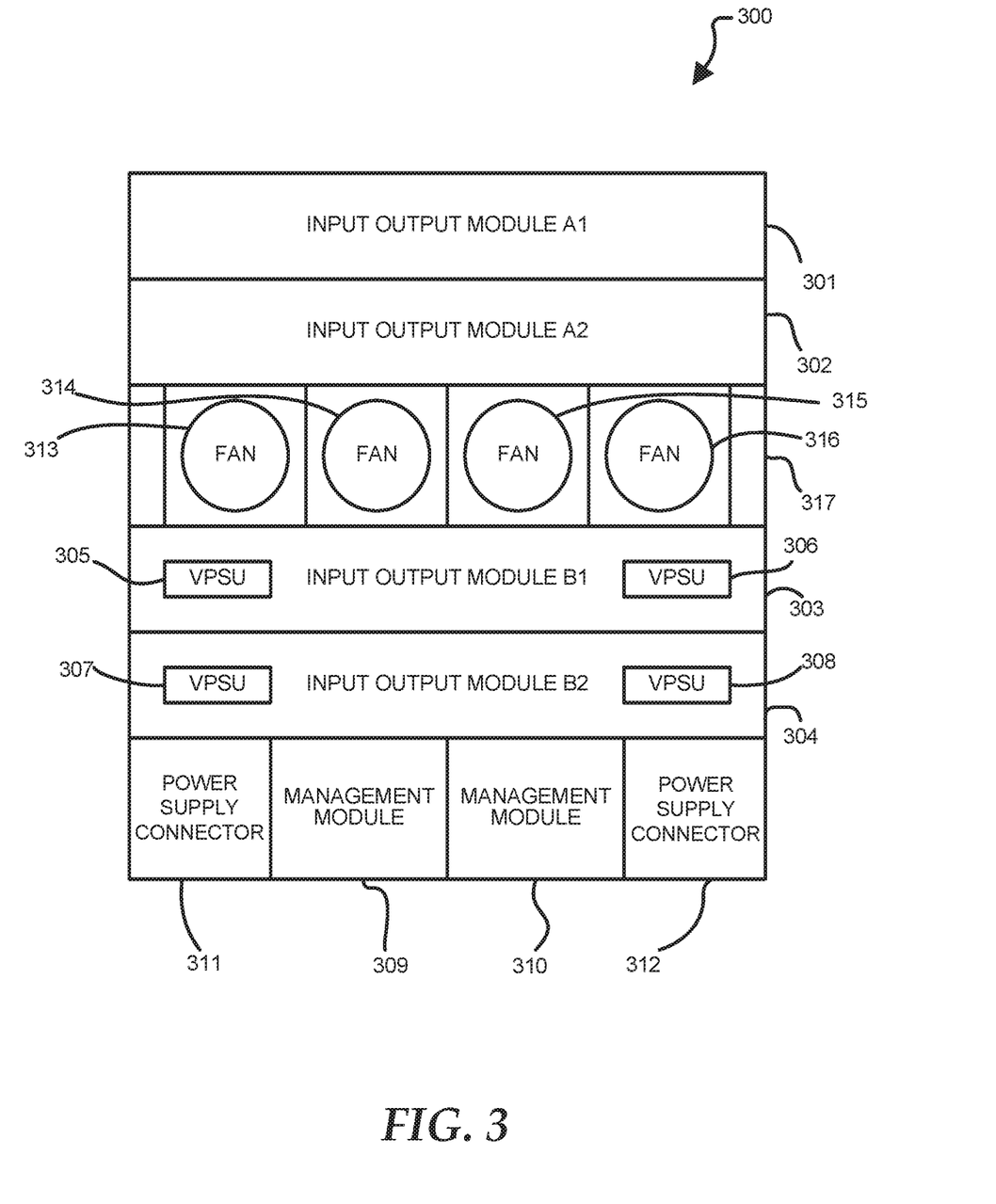
FIG. 3 is a rear view illustrating an information handling system according to an embodiment of the present disclosure.

FIG. 3 shows an information handling system 300 that includes IOM 301, IOM 302, IOM 303, IOM 304, fan assembly 317, management module 309, management module 310, power supply connectors 311, and power supply connectors 312. Fan assembly 317 includes fans 313, 314, 315, and 316. IOM 303 includes one or more VPSUs 305 and 306. IOM 304 includes one or more VPSUs 307 and 308. In accordance with at least one embodiment, one or more of PSUs 231-236 are connected to and provide power to IOM 303 and 304, including to VPSUs 305-308. One or more of IOMs 303 and 304 are connected to one or more of processor sleds 201-208, with one or more of VPSUs 305-308 providing otherwise-trapped power to one or more of processor sleds 201-208 via one or more of VPSU connectors 211-218. Management modules 309 and 310 may be implemented, for example, as circuits for managing and communicating with portions of information handling system 300, such as IOMs, processor sleds, etc.

Figure 4:
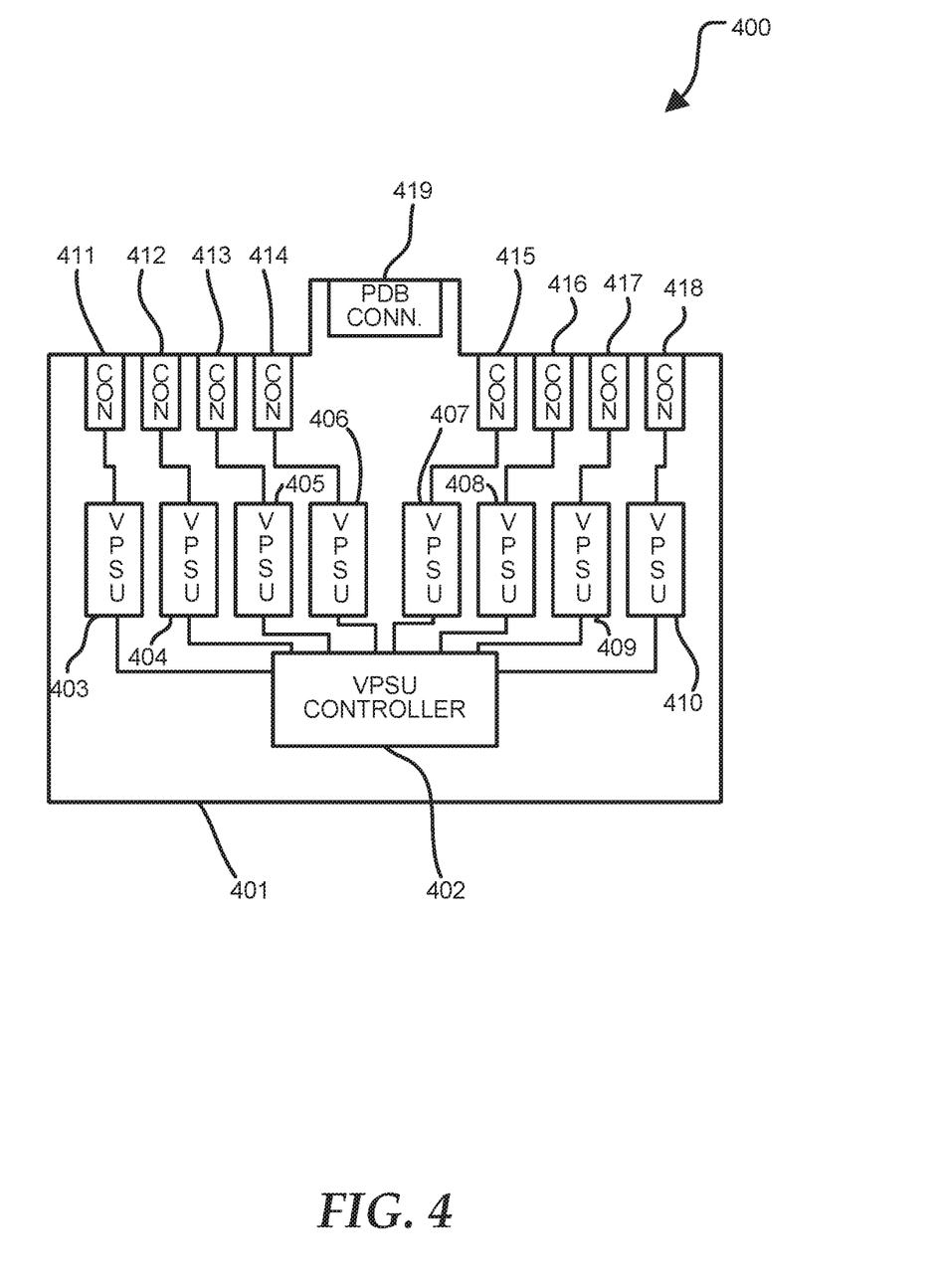
FIG. 4 is a plan view illustrating a circuit board including a virtual power supply unit according to an embodiment of the present disclosure.

FIG. 4 shows a circuit board 400 including a VPSU according to an embodiment of the present disclosure. Circuit board 400, which may be, for example, an IOM circuit board, includes a printed circuit board (PCB), a power distribution board (PDB) connector 419, connectors 411, 412, 413, 414, 415, 416, 417, and 418, VPSUs 403, 404, 405, 406, 407, 408, 409, and 410, and a VPSU controller 402. VPSU controller 402 is connected to one or more of (for example each of) VPSUs 403-410. VPSU controller 402 may be connected, for example, to one or more of management modules 309 and 310. One or more of management modules 309 and 310 may be supplementarily or alternatively connected to one or more of VPSUs 403-410. As an alternative to VPSU controller 402, control of VPSUs 403-410 can be centralized in one or more of management modules 309 and 310, with one or more of management modules 309 and 310 connected to one or more of VPSUs 403-410.

VPSU 403 is connected to connector 411, which allows connection, for example, to VPSU connector 218 of processor sled 208. VPSU 404 is connected to connector 412, which allows connection, for example, to VPSU connector 217 of processor sled 207. VPSU 405 is connected to connector 413, which allows connection, for example, to VPSU connector 216 of processor sled 206. VPSU 406 is connected to connector 414, which allows connection, for example, to VPSU connector 215 of processor sled 205. VPSU 407 is connected to connector 415, which allows connection, for example, to VPSU connector 214 of processor sled 204. VPSU 408 is connected to connector 416, which allows connection, for example, to VPSU connector 213 of processor sled 203.

VPSU 409 is connected to connector 417, which allows connection, for example, to VPSU connector 212 of processor sled 202. VPSU 410 is connected to connector 418, which allows connection, for example, to VPSU connector 211 of processor sled 201. Connections between connectors 411-418 and VPSU connectors 211-218 can be, for example, made directly between the connectors and the VPSU connectors or via one or more cables, circuit boards, such as mezzanine cards, or other interconnects. PDB connector 419 is adapted to connect to a PDB connected to one or more of PSUs 231-236. The PDB and PDB connector 419 convey power from the one or more PSUs 231-236 to circuit board 401, which conveys the power to one or more VPSUs 403-410 and to circuitry on circuit board 401 used to implement its primary function, such as being adapted to serve as an IOM.

Figure 5:
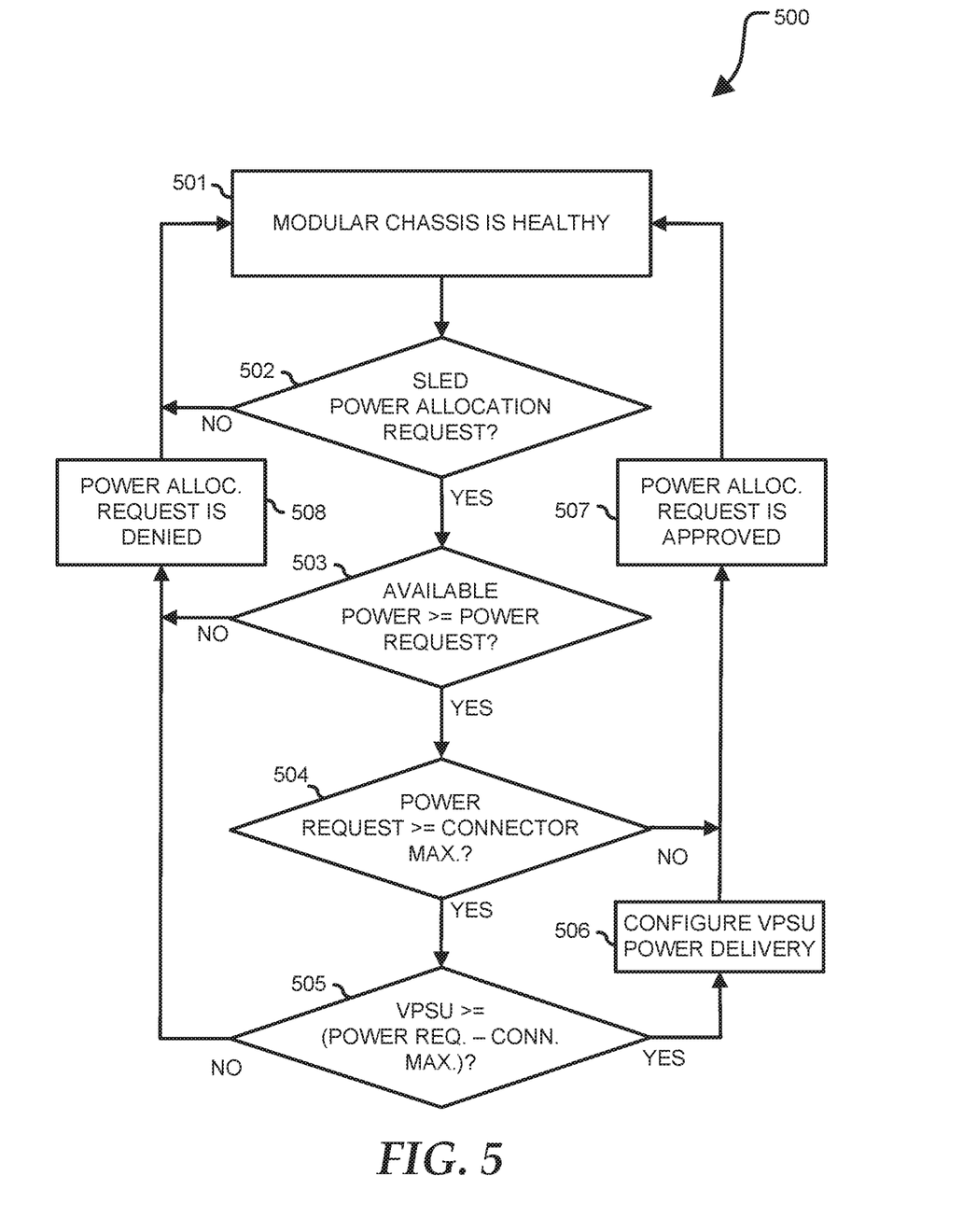
FIG. 5 is a flow diagram illustrating a method according to an embodiment of the present disclosure.

FIG. 5 shows a method 500 that begins in block 501, where a modular chassis is in a nominally healthy state. From block 501, method 500 continues to decision block 502. At decision block 502, a decision is made as to whether or not a power allocation request, such as a sled power allocation request, has been made. If not, method 500 returns to block 501. If a power allocation request has been made, method 500 continues to decision block 503. At decision block 503, a decision is made as to whether or not an amount of available power is greater than or equal to the amount of power requested by the power allocation request. If not, method 500 continues to block 508, where the power allocation request is denied.

If sufficient power is available to satisfy the power allocation request, method 500 continues to decision block 504, where a decision is made as to whether or not the requested power of the power allocation request is greater than or equal to a maximum amount of power that can be provided via power connectors of currently configured power supplies. If not, method 500 continues to block 507, where the power allocation request is approved. If the requested power of the power allocation request is greater than or equal to the maximum amount of power that can be provided via power connectors of currently configured power supplies, method 500 continues to decision block 505.

At decision block 505, a decision is made as to whether or not one or more VPSUs can provide an amount of otherwise-trapped power greater than or equal to an amount equal to the requested amount of power of the power allocation request minus the connector maximum amount of power that can be provided via currently configured power supplies, such as one or more of PSUs 231-236. If not, method 500 continues to block 508, where the power allocation request is denied. From block 508, method 500 continues to block 501.

If one or more VPSUs can provide an amount of otherwise-trapped power greater than or equal to the difference between the requested amount of power of the power allocation request and the connector maximum amount of power that can be provided via currently configured power supplies, method 500 continues to block 506. At block 506, one or more VPSUs are configured to provide VPSU power delivery. From block 506, method 500 continues to block 507, where the power allocation request is approved. From block 507, method 500 continues to block 501.

Future generations of modular compute nodes have increasing power demands due to the significant increase of central processing unit (CPU) thermal design power (TDP), peak power, and platform turbo mode power levels. Using newly developed processors in an existing chassis can be problematic when the power connectors utilized within the chassis have limited levels of power they can convey which may be less than the power levels the newly developed processors may consume. As an example, a chassis processor sled connector from a PSU to a processor sled may have a maximum sustained power delivery value designed for previous generations of processors, which may be or may become insufficient to meet the rising trend of processor sled power demands.

A chassis infrastructure design may include provision for power delivery up to a fixed amount (for example 360 watts (W)) to each of a plurality of circuit board slots (for example four IOM slots). However, available IOMs may utilize only a portion of that fixed amount (for example 100 W or less), which results in trapped power (for example typically 250 W+ per slot). Heretofore, that trapped power could not be redirected to power-hungry subsystems, such as processor sleds.

In accordance with at least one embodiment, in the event that a requested amount of power would exceed a power limit of a main power connector on a first circuit board on which a first load circuit is disposed, a parallel path of power is enabled to a supplemental power connector of the first circuit board via a VPSU of second circuit board on which a second load circuit is disposed.

Adding actual PSUs in slots other than dedicated PSU locations in a chassis is a method that has the ability to provide power to downstream devices. Supplying supplemental power to a first circuit board, wherein the first circuit board has a first load circuit having a first current draw in excess of a first current capacity of a main power connector of the first circuit board by adding one or more VPSUs to a second circuit board, wherein the second circuit board is allocated a second amount of power, wherein the second amount of power is in excess of a second current draw of the second circuit board's second load circuit, can provide a multi-generational design to redistribute trapped power or enable redistribution of power under existing firmware features with hardware that is fundamentally different than a native PSU, wherein one or more instances of a native PSU provides power to both the first circuit board and the second circuit board.

Future generations of modular compute nodes have increasing power demands that challenge the multi-generational designs around chassis power supplies and chassis connector power delivery. Chassis infrastructure, such as the power distribution board (PDB) and chassis processor sled power connectors for delivering power from one or more physical PSUs to one or more processor sled circuit boards, is not expected to change during the long life of a modular chassis. In accordance with at least one embodiment, a novel system and method is provided to expand chassis features such as power delivery without necessitating a change of the chassis infrastructure.

In accordance with at least one embodiment, an alternate power delivery path is provided by redirecting trapped power from chassis components, such as IOMs, to highly configured processor sleds that exceed the chassis sled power connector capabilities via what is referred to as a VPSU. A VPSU includes circuitry to instantiate the VPSU in a manner that allows existing firmware power management, monitoring, and control features to manage, monitor, and control the VPSU as if it where a physical PSU, such as one of the one or more physical PSUs that provides power, including the trapped power, to the chassis component comprising the VPSU. Thus, the trapped power can be redirected and beneficially utilized at a location (for example a processor sled) different from the chassis component (for example an IOM) to which the trapped power is allocated to be provided by the physical PSU.

As an example, a first processor sled may request a power allocation of 1,100 W, which may exceed a 1,000 W connector power limit by 100 W. If the chassis has 1,000 W of power to allocate from the native physical PSUs and 100 W from a VPSU, then a power allocation request can be approved. By comparison, without the benefit of a VPSU, a system as heretofore implemented would always deny a power allocation request that is above the connector power limit, in the case of this example, 1,000 W.

The chassis management module 309 and 310 connection to the VPSUs on IOMs via a management module to IOM control interface turns on the voltage regulator on the IOM for Sled 1 with the total VPSU power configured to provide 100 W. Power management firmware includes the VPSU with an effective capacity of 100 W with the power allocation from the native PSUs, removes 100 W of trapped power from the IOM, and sets all power budgeting and allocation reporting according to the existing feature set.

A chassis power manager, which may be instantiated, for example, in a management module, such as management module 309 or 310, will calculate processor sled power limits that include the peak and sustained power capabilities of the native physical PSUs and VPSUs. If an IOM with a VPSU is removed or otherwise fails, then the power management firmware treats the system in the same manner as if a native physical PSU has failed. New power management limits are set, and the affected one or more processor sleds will operate within the bounds of the design, which includes the primary power connector to the processor sled. Firmware power features will include the power reported by the modular hot swap controller with the output of the VPSU to appropriately manage processor sled and chassis power.

In accordance with at least one embodiment, a method is provided to identify trapped power in a subsystem or circuit board, such as one or more IOMs, a method is provided to deliver trapped power from the subsystem or circuit board having the trapped power, such as the one or more IOMs, to a subsystem or circuit board needing the trapped power, such as one or more processor sleds, and a method is provided to integrate the VPSUs providing the trapped power with existing power management, monitoring, and control firmware used to manage, monitor, and control native physical PSUs.

In accordance with at least one embodiment, a method is provided to identify trapped power in a subsystem or circuit board, such as one or more IOMs. As an example, the power delivery infrastructure of a chassis may support power delivery in excess of the power actually used by a subsystem or circuit board (for example supporting power delivery of 360 W per IOM slot, where typical IOMs may consume significantly less than 100 W each). The result is trapped power in the IOM, because the excess power could be delivered to, but is not utilized by the IOMs, yet it has not heretofore been possible to redirect that trapped power to another subsystem or circuit board (for example one or more processor sleds) where the trapped power could be utilized.

In accordance with at least one embodiment, hardware power delivery is provided from a subsystem or circuit board (for example one or more IOMs) capable of providing trapped power to a subsystem or circuit board (for example one or more processor sleds) capable of using the trapped power. As an example, an IOM may be configured to mate with a processor sled mezzanine card to provide a power delivery path from the IOM slot through the processor sled mezzanine card to the processor sled main power rail. Accordingly, trapped power within an IOM can be redirected to one or more processor sleds. As an example, the power delivery can be controlled by (but is not limited to) a constant current regulator that delivers power safely from the IOM to the processor sleds within the limits of the power delivery design.

One example of an IOM consumes up to 24 W but is capable of sourcing up to 360 W from the chassis PSUs. Such an IOM has the power delivery capability and circuit board real estate to implement VPSUs. As an example, a VPSU-enabled IOM can be selectively configured to provide power to one or more processor sleds so as to supplement power the one or more processor sleds obtain directly from the chassis PSUs. As an example, a power delivery path can be provided from a chassis PSU, via a chassis PDB, to an IOM where a VPSU can be configured to deliver power to a sled in parallel to the sled power connector via the mezzanine card subsystem.

In accordance with at least one embodiment, integration with existing power management, monitoring, and control firmware is provided. Introducing a parallel power delivery path to a processor sled could introduce potential complexity around power management, monitoring, and control. However, by implementing trapped power redirection circuitry to serve as a VPSU, the management of power redistribution within a server or modular chassis can be simplified, as management processes and structures can treat the VPSU as if it were a native physical PSU such as provides power to both the VPSU redirecting the trapped power and the load (for example processor sled) receiving the redirected trapped power. Thus, integration with existing firmware features can be provided while relaxing the hardware design and telemetry complexity.

A VPSU is created by a hardware solution such as a constant current regulator that works with firmware to turn power on or off to a downstream device. While the downstream device is downstream with respect to the VPSU, it is also downstream from a native physical PSU via a different path from the native physical PSU to the downstream device. Thus, the parallel paths from the native physical PSU to the downstream device and, separately, from the native physical PSU to the VPSU, then to the downstream device cumulatively provide a requested amount of power to the downstream device when the requested amount of power exceeds the amount of power that can be provided along the direct path from the native physical PSU to the downstream device.

When the power is enabled, the system firmware creates a new instance of a PSU (in the form of a VPSU but appearing as if it were a native physical PSU) to provide power to the downstream device or node. Treating the power redistribution hardware as a PSU is a solution to gracefully integrate this new feature into existing power management, monitoring, and control techniques. For example, when a VPSU is enabled, the firmware adds the effective capacity to the power budget for the device or node, and, if the VPSU fails, becomes unhealthy, or is removed from the system, the firmware treats the occurrence as if a native physical PSU was lost. These are normal functions for firmware that are applied to native physical PSUs, so enabling a VPSU to masquerade as a native physical PSU allows uniform management, monitoring, and control of power resources in a manner backwards compatible with existing techniques.

An example of at least one embodiment is for a VPSU to deliver power only when the processor sled is already consuming a significant amount of power from the primary connector since supplemental power via the VPSU is, according to such an example, only needed if the processor sled power consumption approaches the connector maximum power limit. For example, a VPSU may be turned on to deliver 100 W of power to a sled when the chassis identifies that the sled is consuming 750 W of power (or ¾ of connector maximum power limit) as reported by the sled hot swap controller. The VPSU can be turned off when the sled power decreases to 500 W (or ½ of connector maximum power limit). This method of hysteresis can enable the VPSU to operate at its most efficient level and to deliver a predetermined amount of steady state power. The known amount of steady state power delivery from the VPSU enables power budgeting and power limiting features to easily incorporate the VPSU effective capacity into existing calculations and formulas as it already does with native physical PSUs. Such a method does not require a VPSU to have advanced power management, monitoring, and reporting features to be incorporated into the existing firmware power management feature set.

In accordance with at least one embodiment, a system and method are provided to allow trapped power, which is unutilized power capable of being delivered to a subsystem, to be allocated, redirected, and delivered to one or more other system components through a physical interface separate from the one or more system components' primary power delivery interfaces.

In accordance with at least one embodiment, a firmware solution is provided to create a VPSU that enables a system to manage redirected power downstream from native physical PSUs with existing firmware solutions for power budgeting, allocations, monitoring, and failures. This solution allows the system to treat redirected power as if it is an additional PSU, even though the underlying hardware is fundamentally different, which enables graceful integration into the existing power management feature set.

In accordance with at least one embodiment, an information handling system (IHS) includes a physical power supply unit (PSU) configured to provide power to a plurality of subsystems of the IHS; a first load subsystem of the plurality of subsystems, the first load subsystem connected to the physical PSU to receive a first portion of a first load power directly from the physical PSU via a main power connector, the main power connector having a power limit less than the first load power; and a second load subsystem of the subsystems, the second load subsystem connected to the physical PSU to receive a second load power directly from the physical PSU and to provide a second portion of the first load power to the first load subsystem via a power connection between the second load subsystem and the first load subsystem, wherein a sum of the first portion of the first load power and the second portion of the first load power is greater than the power limit of the main power connector.

In accordance with at least one embodiment, the IHS further includes a management module connected to the physical PSU, to the first load subsystem and to the second load subsystem, the second load subsystem comprising a VPSU configured to provide the second portion of the first load power, the management module configured to manage the physical PSU and the VPSU both as generic PSUs. In accordance with at least one embodiment, the first load subsystem is a processor sled. In accordance with at least one embodiment, the second load subsystem is an input-output module (IOM) configured to provide data input and output for the processor sled. In accordance with at least one embodiment, the IHS further includes a third load subsystem, the third load subsystem being a second processor sled, the third load subsystem connected to the physical PSU to receive a first portion of a third load power directly from the physical PSU via a third load subsystem main power connector, the third load subsystem main power connector having a third load subsystem power limit less than the third load power, the second load subsystem comprising a first VPSU configured to provide a second portion of the first load power; and a second VPSU configured to provide a second portion of the third load power.

In accordance with at least one embodiment, the second load subsystem further includes a VPSU controller, the VPSU controller connected to the first VPSU and to the second VPSU, the VPSU controller configured to control the first VPSU and the second VPSU in response to power requests of the first load subsystem and the third load subsystem. In accordance with at least one embodiment, the IHS further includes a management module connected to the physical PSU, to the first load subsystem, to the second load subsystem, to the third load subsystem, and to the VPSU controller, the management module configured to manage the physical PSU, the first VPSU, and the second VPSU all as generic PSUs, the management module configured to manage the first VPSU and the second VPSU via the VPSU controller.

In accordance with at least one embodiment, a method includes receiving a power allocation request from a processor sled; determining if an available amount of power is greater than or equal to a requested amount of power of the power allocation request; determining if the requested amount of power is greater than or equal to a power connector maximum power limit; determining if a VPSU output power is greater than or equal to the requested amount of power minus the power connector maximum power limit; and, when the VPSU output power is greater than or equal to the requested amount of power minus the power connector maximum power limit, configuring a VPSU to deliver VPSU power to the processor sled.

In accordance with at least one embodiment, the VPSU power supplements a main power amount delivered to the processor sled from the physical PSU via a main power connector subject to the power connector maximum power limit. In accordance with at least one embodiment, the VPSU receives a VPSU input power from the physical PSU. In accordance with at least one embodiment, the method is performed with respect to a plurality of processor sleds for a plurality of VPSUs, the plurality of VPSUs receiving their respective VPSU input powers from the physical PSU. In accordance with at least one embodiment, the method is performed via a VPSU controller, the VPSU controller connected to the VPSUs.

In accordance with at least one embodiment, the method further includes indicating a physical PSU failure to be a generic PSU failure; and indicating a VPSU failure to be a generic PSU failure. In accordance with at least one embodiment, the, when the VPSU output power is greater than or equal to the requested amount of power minus the power connector maximum power limit, configuring the VPSU to deliver the VPSU power to the processor sled further includes granting the power allocation request.

In accordance with at least one embodiment, an information handling system (IHS) includes a physical power supply unit (PSU) configured to provide power to a plurality of subsystems of the IHS; a first load subsystem of the plurality of subsystems, the first load subsystem connected to the physical PSU to receive a first portion of a first load power directly from the physical PSU via a primary power delivery interface, the primary power delivery interface having a power limit less than the first load power; and a second load subsystem of the plurality of subsystems, the second load subsystem connected to the physical PSU to receive a second load power directly from the physical PSU, the second load subsystem comprising a first trapped power redirection circuit instantiated as a VPSU configured to redirect unutilized power capable of being delivered to the second load subsystem through a physical interface separate from the primary power delivery interface of the first load subsystem to provide a second portion of the first load power to the first load subsystem, wherein a sum of the first portion of the first load power and the second portion of the first load power is greater than the power limit of the primary power delivery interface.

In accordance with at least one embodiment, the IHS further includes a management module connected to the physical PSU, to the first load subsystem and to the second load subsystem, the management module configured to manage the physical PSU and the VPSU both as generic PSUs. In accordance with at least one embodiment, the first load subsystem is a processor sled. In accordance with at least one embodiment, the second load subsystem is an input-output module (IOM) configured to provide data input and output for the processor sled.

In accordance with at least one embodiment, the IHS further includes a third load subsystem, the third load subsystem being a second processor sled, the third load subsystem connected to the physical PSU to receive a first portion of a third load power directly from the physical PSU via a third load subsystem primary power delivery interface, the third load subsystem primary power delivery interface having a third load subsystem power limit less than the third load power, the second load subsystem comprising a first VPSU configured to provide a second portion of the first load power; and a second VPSU configured to provide a second portion of the third load power. In accordance with at least one embodiment, the second load subsystem further includes a VPSU controller, the VPSU controller connected to the first VPSU and to the second VPSU, the VPSU controller configured to control the first VPSU and the second VPSU in response to power requests of the first load subsystem and the third load subsystem.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system (IHS) comprising:
   a physical power supply unit (PSU);
   a first load subsystem connected to the physical PSU to receive a first portion of a first load power directly from the physical PSU via a main power connector, the main power connector having a power limit less than the first load power; and
   a second load subsystem connected to the physical PSU to receive a second load power directly from the physical PSU, if a requested amount of power from the first load subsystem is greater than or equal to a power connector maximum power limit, then a determination is made whether the second load subsystem has been removed from the information handling system; if the second load subsystem has been removed, then the requested amount of power is denied; and if the second load subsystem has not been removed:
   the second load subsystem to consume an amount of power less than the second load power, and to provide a second portion of the first load power to the first load subsystem via a power connection between the second load subsystem and the first load subsystem, wherein the second portion of the first load power is a portion of the second load power not utilized by the second load subsystem, wherein the first load subsystem is a first sled of a chassis and the second load subsystem is a second sled of the chassis, wherein a sum of the first portion of the first load power and the second portion of the first load power is greater than the power limit of the main power connector.

2. The IHS of claim 1 further comprising:
   a hardware management module connected to the physical PSU, to the first load subsystem and to the second load subsystem, the second load subsystem comprising a virtual PSU (VPSU) circuit configured to provide the second portion of the first load power, the hardware management module configured to manage the physical PSU and the VPSU both as generic PSUs.

3. The IHS of claim 1, wherein the first load subsystem comprises:
   a processor circuit board.

4. The IHS of claim 3, wherein the second load subsystem is an input-output module (IOM) device configured to provide data input and output for the processor circuit board.

5. The IHS of claim 4 further comprising:
   a third load subsystem, the third load subsystem comprising a second processor circuit board, the third load subsystem connected to the physical PSU to receive a first portion of a third load power directly from the physical PSU via a third load subsystem main power connector, the third load subsystem main power connector having a third load subsystem power limit less than the third load power, the second load subsystem comprising:
   a first virtual PSU (VPSU) circuit configured to provide the second portion of the first load power; and
   a second VPSU circuit configured to provide a second portion of the third load power.

6. The IHS of claim 5, wherein the second load subsystem further comprises:
   a VPSU controller, the VPSU controller connected to the first VPSU circuit and to the second VPSU circuit, the VPSU controller configured to control the first VPSU circuit and the second VPSU circuit in response to power requests of the first load subsystem and the third load subsystem.

7. The IHS of claim 6 further comprising:
   a hardware management module connected to the physical PSU, to the first load subsystem, to the second load subsystem, to the third load subsystem, and to the VPSU controller, the hardware management module configured to manage the physical PSU, the first VPSU circuit, and the second VPSU circuit all as generic PSUs, the hardware management module configured to manage the first VPSU circuit and the second VPSU circuit via the VPSU controller.

8. A method comprising:
   receiving a power allocation request from a first load subsystem of an information handling system;
   determining if an available amount of power is greater than or equal to a requested amount of power of the power allocation request;
   determining if the requested amount of power is greater than or equal to a power connector maximum power limit;
   if the requested amount of power is greater than or equal to the power connector maximum power limit, then determining if a second load subsystem including a virtual power supply unit (VPSU) circuit has been removed from the information handling system;
   if the second load subsystem has been removed, then denying the requested amount of power; and
   when the second load subsystem has not been removed:
   determining if a VPSU output power is greater than or equal to the requested amount of power minus the power connector maximum power limit; and
   when the VPSU output power is greater than or equal to the requested amount of power minus the power connector maximum power limit, configuring the VPSU circuit of the second load subsystem to deliver VPSU power to the first load subsystem, wherein the first load subsystem is a first sled of a chassis and the second load subsystem is a second sled of the chassis.

9. The method of claim 8, wherein the VPSU power supplements a main power amount delivered to the first load subsystem from a physical power supply unit (PSU) device via a main power connector subject to the power connector maximum power limit.

10. The method of claim 9, wherein the first VPSU circuit receives a VPSU input power from the physical PSU.

11. The method of claim 10, wherein the method is further performed with respect to a plurality of load subsystems for a plurality of VPSU circuits, the plurality of VPSU circuits receiving their respective VPSU input powers from the physical PSU, wherein the plurality of load subsystems includes the first load subsystem, and the plurality of VPSU circuits includes the VPSU circuit.

12. The method of claim 11, wherein the method is performed via a VPSU controller, the VPSU controller connected to the plurality of VPSU circuits.

13. The method of claim 8 further comprising:
indicating a physical PSU failure to be of a generic PSU failure type; and
indicating a VPSU failure to be of the generic PSU failure type.

14. The method of claim 8, wherein the first load subsystem comprises a processor circuit board.

15. An information handling system (IHS) comprising:
a physical power supply unit (PSU);
a first load subsystem connected to the physical PSU to receive a first portion of a first load power directly from the physical PSU via a primary power delivery interface, the primary power delivery interface having a power limit less than the first load power; and
a second load subsystem to be connected to the physical PSU to receive a second load power directly from the physical PSU, if a requested amount of power from the first load subsystem is greater than or equal to a power connector maximum power limit, then a determination is made whether the second load subsystem has been removed from the information handling system; if the second load subsystem has been removed, then the requested amount of power is denied, and if the second load subsystem has not been removed:
the second load subsystem including a first trapped power redirection circuit instantiated as a virtual PSU (VPSU) circuit configured to redirect unutilized power capable of being delivered to the second load subsystem through a physical interface separate from the primary power delivery interface of the first load subsystem to provide a second portion of the first load power to the first load subsystem, wherein the first load subsystem is a first sled of a chassis and the second load subsystem is a second sled of the chassis, wherein a sum of the first portion of the first load power and the second portion of the first load power is greater than the power limit of the primary power delivery interface.

16. The IHS of claim 15 further comprising:
a hardware management module connected to the physical PSU, to the first load subsystem and to the second load subsystem, the hardware management module configured to manage the physical PSU and the VPSU both as generic PSUs.

17. The IHS of claim 15, wherein the first load subsystem comprises:
a processor circuit board.

18. The IHS of claim 17, wherein the second load subsystem is an input-output module (IOM) device configured to provide data input and output for the processor circuit board.

19. The IHS of claim 18 further comprising:
a third load subsystem, the third load subsystem comprising a second processor circuit board, the third load subsystem connected to the physical PSU to receive a first portion of a third load power directly from the physical PSU via a third load subsystem primary power delivery interface, the third load subsystem primary power delivery interface having a third load subsystem power limit less than the third load power, the second load subsystem comprising:
a first VPSU circuit configured to provide the second portion of the first load power; and
a second VPSU circuit configured to provide a second portion of the third load power.

20. The IHS of claim 19, wherein the second load subsystem further comprises:
a VPSU controller, the VPSU controller connected to the first VPSU circuit and to the second VPSU circuit, the VPSU controller configured to control the first VPSU circuit and the second VPSU circuit in response to power requests of the first load subsystem and the third load subsystem.

* * * * *